(12) United States Patent  (10) Patent No.: US 8,347,689 B2
Arvaneh                    (45) Date of Patent:     Jan. 8, 2013

(54) TOOL FOR ASSISTING LEAK TESTING OF AN ENCLOSED VOLUME AND METHOD INCORPORATING THE TOOL

(75) Inventor: Michael M. Arvaneh, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 529 days.

(21) Appl. No.: 12/633,248

(22) Filed: Dec. 8, 2009

(65) Prior Publication Data
US 2011/0132075 A1    Jun. 9, 2011

(51) Int. Cl.
*G01M 3/04* (2006.01)
(52) U.S. Cl. .......................................... 73/40
(58) Field of Classification Search .................. 73/40
See application file for complete search history.

(56) References Cited

U.S. PATENT DOCUMENTS 5,623,214 A * 4/1997 Pasiecznik, Jr. ......... 324/755.09
2005/0261581 A1* 11/2005 Hughes et al. ................. 600/434
2008/0214953 A1* 9/2008 Hashimshony et al. ...... 600/562

* cited by examiner

*Primary Examiner* — Peter MacChiarolo
*Assistant Examiner* — Alex Devito
(74) *Attorney, Agent, or Firm* — Dinsmore & Shohl LLP (57) ABSTRACT

A tool for assisting the leak testing of an enclosed volume is disclosed. The tool may comprise an outer seal defining inside its perimeter an attachment face of the tool. A vacuum port defined in the attachment face is configured to be fluidly coupled to a vacuum source. A nozzle disposed in the attachment face may be coupled to the test port, in fluid communication with the enclosed volume. A primary connection in fluid connection with the nozzle may be placed in fluid connection with the external conduit. A nozzle seal is disposed in the attachment face around the perimeter of the nozzle, such that when the nozzle is coupled to the test port, the nozzle is fluidly isolated from said vacuum port. A leak-test system incorporating at least one tool and a method for leak testing an enclosed volume using the tool are disclosed.

16 Claims, 6 Drawing Sheets

TOOL FOR ASSISTING LEAK TESTING OF AN ENCLOSED VOLUME AND METHOD INCORPORATING THE TOOL

The present invention relates generally to a leak-testing apparatus and method, and more specifically to a tool and method for dispensing tracer gases into an enclosed volume or exhausting the tracer gases from the enclosed volume during a leak-testing process cycle.

BACKGROUND

Manufacturing specifications for enclosed volumes often require that the enclosed volumes be essentially leak-free, with little or no tolerance for escaping gases of any kind or amount. As used herein, the term "enclosed volume" may refer to any volume defined within an enclosure made up of one or more walls that surround or otherwise substantially isolate the enclosed volume. Common types of enclosed volumes include, but are not limited to, gas storage vessels, fuel cell compartments, vehicle engine components, battery enclosures, and vacuum reactors. It is well known that covers enclosing electric-vehicle batteries (for example batteries falling into a class of rechargeable energy storage systems (RESS)) must be completely impervious to leaks to ensure proper operation of the batteries. To determine whether these or any other type of enclosed volume contains leaks, the manufacturer often requires as a quality control validation that one or more leak-testing methods be employed.

One type of leak-testing method may involve first isolating the enclosure, with the enclosed volume therein, within a secondary enclosure that itself is isolated from the external environment. A suitable tracer gas may be added by any means into the enclosed volume, so as to pressurize the enclosed volume slightly with due care not to exceed a pressure that may compromise the walls of the enclosure in any way. The tracer gas typically is a low molecular-weight, inert gas such as helium, which diffuses readily through any pinpoint leaks present in the outer wall around the enclosed volume. If tracer gas escapes through a leak in the outer wall, its presence can be detected within the secondary enclosure by sensitive instruments such as a mass spectrometer. If no leak is detected, the tracer gas can be removed from the enclosed volume and the outer wall can be said to have passed quality control. However, in such a test configuration, a false-positive determination of a defective outer wall can result if the means for adding the tracer gas into the enclosed volume itself has a leak that allows tracer gas to enter the secondary enclosure. If the leak is severe, the tracer gas can contaminate the secondary enclosure and require time-consuming purge cycles before further testing can resume. Even so, tools or process steps necessary to ensure leak-free input of the tracer gas into the enclosed volume also can add time and expense to the leak-testing process.

Therefore, there is an ongoing need for tools that facilitate during leak-testing operations the introduction of tracer gases into enclosed volumes and the removal of the tracer gases from the enclosed volumes without leakage around the tool. Furthermore, there remains an ongoing need for systems incorporating such tools and methods for leak testing that employ the tools in a low-cost, simplified manner.

BRIEF SUMMARY

These needs are met through the present invention which includes tools for assisting leak testing of an enclosed volume, systems incorporating the tools, and leak-testing methods employing the tools.

In accordance with one embodiment, a tool for fluidly coupling an external conduit to a test port defined in an enclosure outer wall is described. The tool comprises an outer seal that defines an attachment face of the tool inside the perimeter of the outer seal. A vacuum port is defined in the attachment face, and the vacuum port can be fluidly coupled to a vacuum source. A nozzle is disposed in the attachment face, and the nozzle can be coupled to the outer wall so as to be in fluid communication with an enclosed volume within the enclosure through a test port. A primary connection of the tool is in fluid connection with the nozzle, and the primary connection can be placed in fluid connection with the external conduit. To doubly isolate the nozzle from the external environment, a nozzle seal is disposed in the attachment face around the perimeter of the nozzle. When the nozzle is coupled to the test port, the nozzle is fluidly isolated from the vacuum port. Also when the nozzle is coupled to the test port, the outer seal contacts the outer wall of the enclosed volume so as to fluidly isolate all of the attachment face of the tool from the external environment, thereby effecting a vacuum-locking fit between the tool and the enclosure. The tool may further comprise a guide bar to assist the coupling of the tool to the test port. The tool may further comprise also a handle that can clamp the external conduit to a primary fitting connection disposed in the tool.

In accordance with another embodiment, a tool for assisting leak testing of an enclosed volume is described. The tool comprises a tool body, a primary connection configured to establish fluid connection between the tool body and an external conduit, and a vacuum inlet configured to establish vacuum connection between the tool body and a vacuum source. The tool body comprises a mounting face having defined therein a vacuum port, a nozzle port, an outer seal groove about a perimeter of the mounting face, and an inner seal groove between the outer seal groove and the nozzle port. A vacuum conduit is defined through the tool body and is configured to provide fluid connection between the vacuum inlet and the vacuum port. A primary conduit is defined through the tool body and is configured to provide fluid connection between the primary connection and the nozzle port. The tool further comprises a nozzle disposed in the nozzle port and in fluid connection with the primary conduit. The nozzle is configured to be placed in fluid connection with a test port defined in an outer wall of the enclosed volume. An inner sealing ring is seated in the inner seal groove, and an outer sealing ring is seated in the outer seal groove. During tool operation, the nozzle is in fluid connection with the test port of the enclosure. At that time, the outer sealing ring, the inner sealing ring, the mounting face, and the surface of the enclosure define a sealing volume that can be evacuated to hold the tool to the surface of the enclosure.

In accordance with another embodiment, a method for leak-testing a battery cover is described. The method comprises providing a process chamber and providing to the process chamber an enclosed volume defined within an outer wall. The outer wall has at least one fill port and at least one outlet port defined therein. At least tool according to another embodiment is provided, for which a primary connection of the tool is connected to a tracer gas source. A tool so configured is referred to as a "fill tool." A vacuum source in fluid connection to a fill tool vacuum port is actuated. Thereupon, the nozzle of the fill tool is coupled to the at least one fill port so as to produce a vacuum-tight seal of the at least one fill tool against the outer wall of the enclosed volume. The at least one outlet port is coupled to a tracer gas outlet that is in fluid connection to an analytical instrument. When the fill tool is securely attached, a gas source valve is opened to produce a tracer gas flow from the tracer gas source, through the nozzle of the fill tool, through the enclosed volume, through the tracer gas outlet, and into the analytical instrument. The amount of tracer gas flowing into the analytical instrument is quantitatively analyzed.

In further embodiments, the coupling of the at least one outlet port to the tracer gas outlet comprises providing a tool according to another embodiment, configured such that a primary connection of the tool is connected to the tracer gas outlet. A tool so configured is referred to as an "outlet tool." The nozzle of the outlet tool is coupled to the outlet port so as to produce a vacuum-tight seal of the outlet tool against the outer wall of the enclosed volume.

BRIEF DESCRIPTION OF THE DRAWINGS

The following detailed description can be understood best when read in conjunction with the following drawings, where like structure is indicated with like reference numerals and in which.

DETAILED DESCRIPTION

Figure 1:
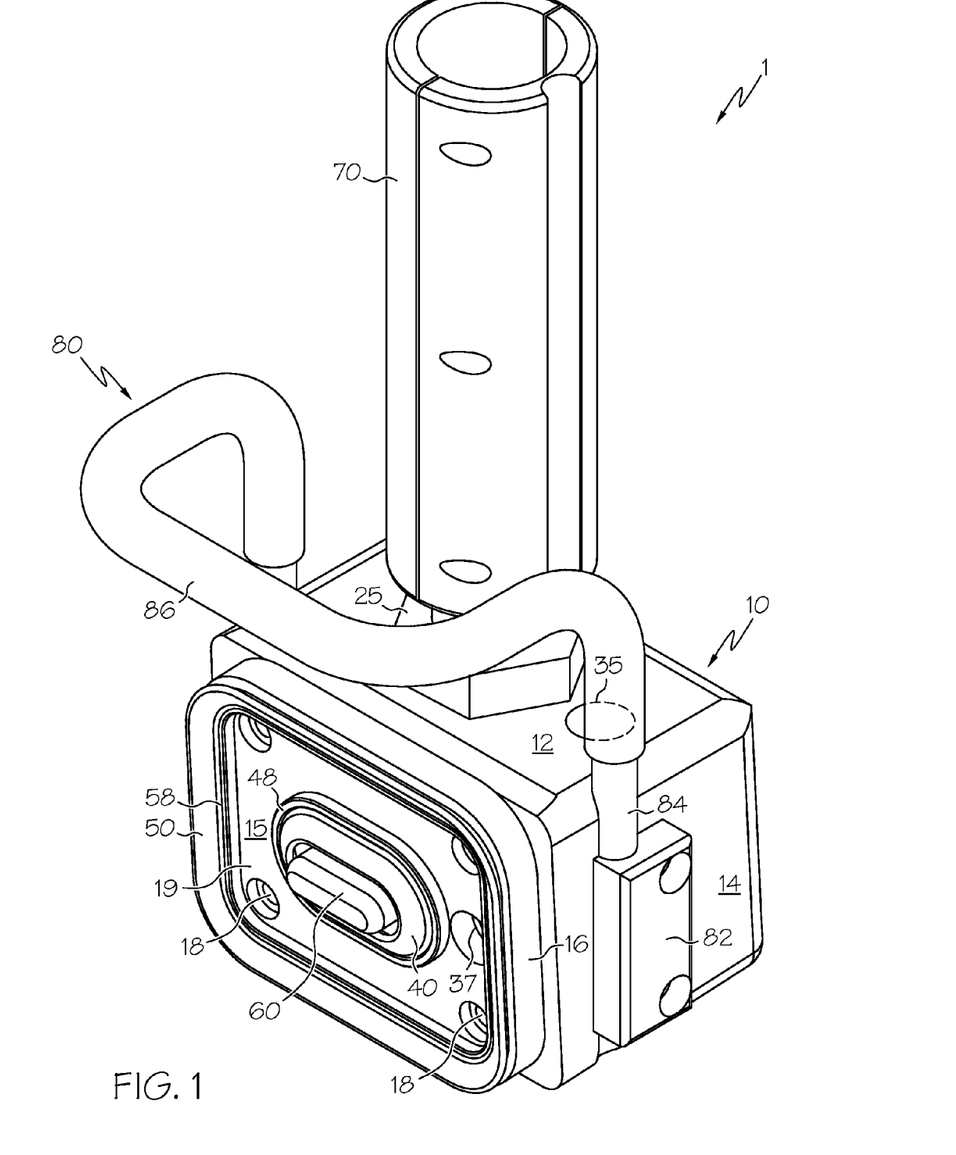
FIG. 1 is a perspective view of an embodiment of a tool for assisting leak testing of an enclosed volume.
Figure 2:
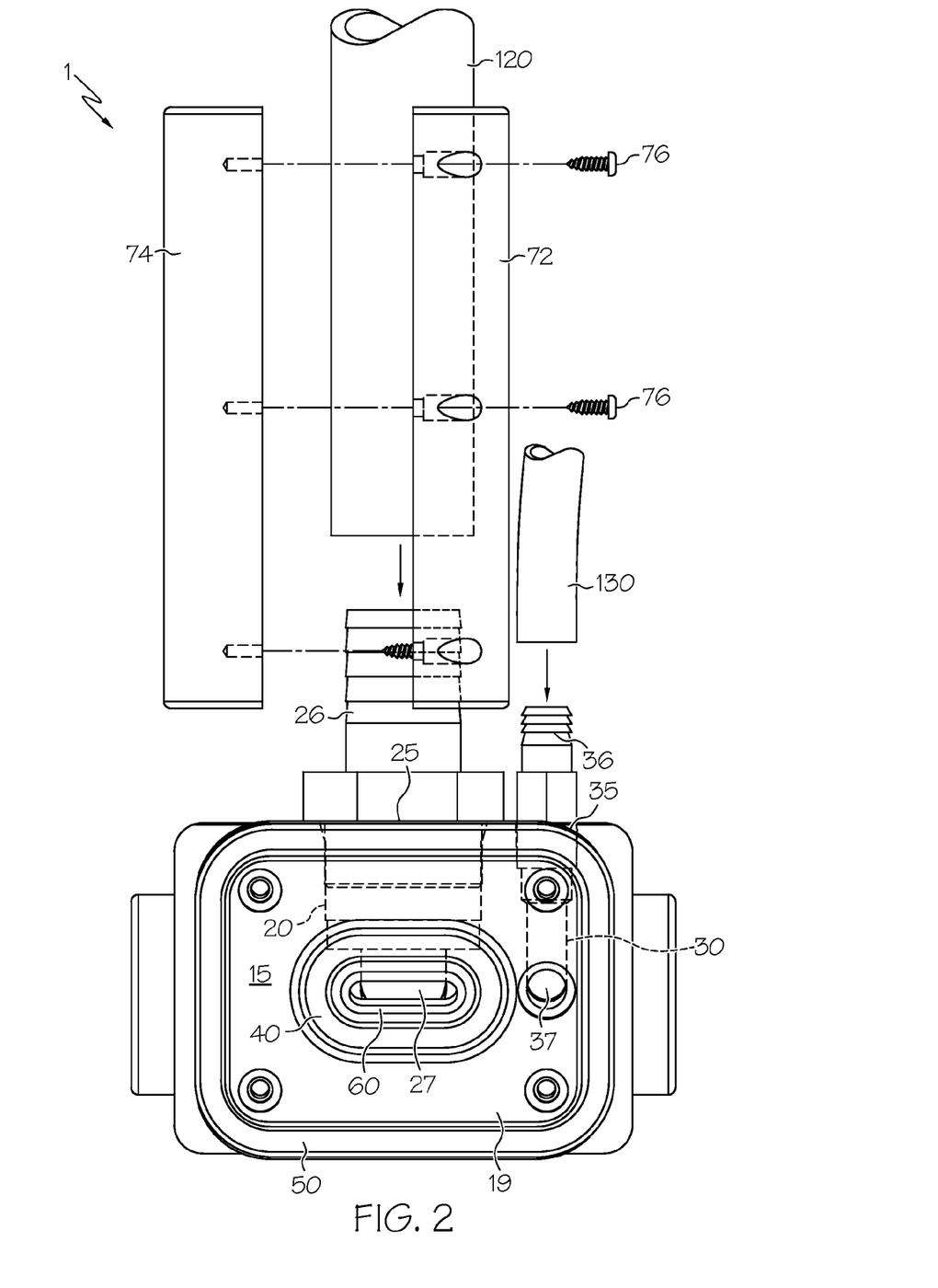
FIG. 2 is a partially exploded front view of an embodiment of the tool for assisting leak testing of an enclosed volume.

Referring initially to FIGS. 1 and 2, an embodiment is shown of a tool 1 for assisting leak testing of an enclosure (not shown). Though in some examples, the tool 1 is suited for use as a battery leak-test tool, it will be understood that the tool 1 can be used for leak testing of any type of enclosure. The tool 1 comprises a tool body 10, depicted in the example embodiment as an essentially rectangular box. The tool body 10 may be constructed of any suitable rigid material such as, for example, metals or plastics. The rigid material may be a lightweight material. An example of a suitable lightweight material is Delrin (a polyoxymethylene plastic, available from DuPont).

A primary connection 25 is shown in the example embodiment within a top face 12 of the tool body 10. The primary connection 25 is configured to establish fluid connection between the tool body 10 and an external conduit 120. As evident in FIG. 2, the primary connection 25 may comprise a primary gas fitting 26. The external conduit 120 may be any type of flexible or rigid tube suitable for conveying a gas to or from the tool body 10. The external conduit 120 may be connected directly or indirectly to a gas source (not shown) or to an vacuum source (not shown), depending on the desired configuration for using the tool 1. In alternative embodiments, the primary connection 25 may be disposed in a side face 14 of the tool body 10 or in a back face (not shown) of the tool body 10.

In example embodiments, the tool 1 may be configured during a leak-testing procedure as a fill tool by connecting the external conduit 120 to a gas source or as an evacuation tool by connecting the external conduit 120 to an vacuum source. In example embodiments of a fill tool configuration, the gas source may be selected from a suitable leak-test tracer gas such as helium or nitrogen, for example. In example embodiments of an evacuation tool configuration, the vacuum source may be situated behind an analytical instrument such as, for example, a mass spectrometer (not shown) so as to draw tracer gas from the enclosed volume through the tool 1 and into the analytical instrument for qualitative or quantitative analysis.

The tool 1 further comprises a vacuum inlet 35 configured to establish vacuum connection between the tool body 10 and a tool-attachment vacuum source (not shown). The vacuum inlet 35 is depicted in FIG. 1 as a hole and in FIG. 2 as configured with a vacuum inlet fitting 36 mounted within the vacuum inlet 35. A vacuum line 130 may be connected to the vacuum inlet fitting 36 by any suitable means so as to establish a direct or indirect vacuum connection between the tool body 10 and a tool-attachment vacuum source (not shown) such as, for example, a vacuum pump. Though the vacuum inlet 35 is shown as disposed in the top face 12 of the tool body 10, it will be apparent that the vacuum inlet 35 alternatively may be disposed in a different face, such as a side face 14 or the back face (not shown).

Referring further to FIG. 1, a mounting face 15 of the tool body 10 has defined therein a vacuum port 37, shown as a round hole by way of illustration and not of limitation. The mounting face 15 further has defined therein a nozzle port 27, shown by way of illustration, not limitation, as a slit with rounded ends and centered within the mounting face 15. The mounting face 15 may be disposed on a face plate 16 attached to the tool body 10, for example, by means of face plate fasteners 18. The face plate fasteners 18 may be any suitable fasteners such as, for example, screws. In alternative embodiments not shown, the mounting face 15 may be integral with the tool body 10 without the need for a separate face plate. Example embodiments of the face plate 16 including the mounting face 15 are shown in FIGS. 3A and 4.

Figure 3A:
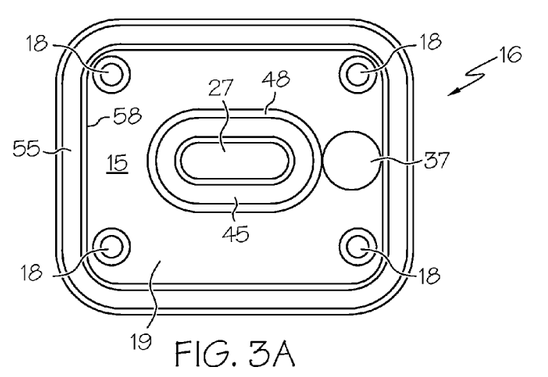
FIG. 3A is a plan view of a face plate of an embodiment of the tool for assisting leak testing of an enclosed volume.
Figure 4:
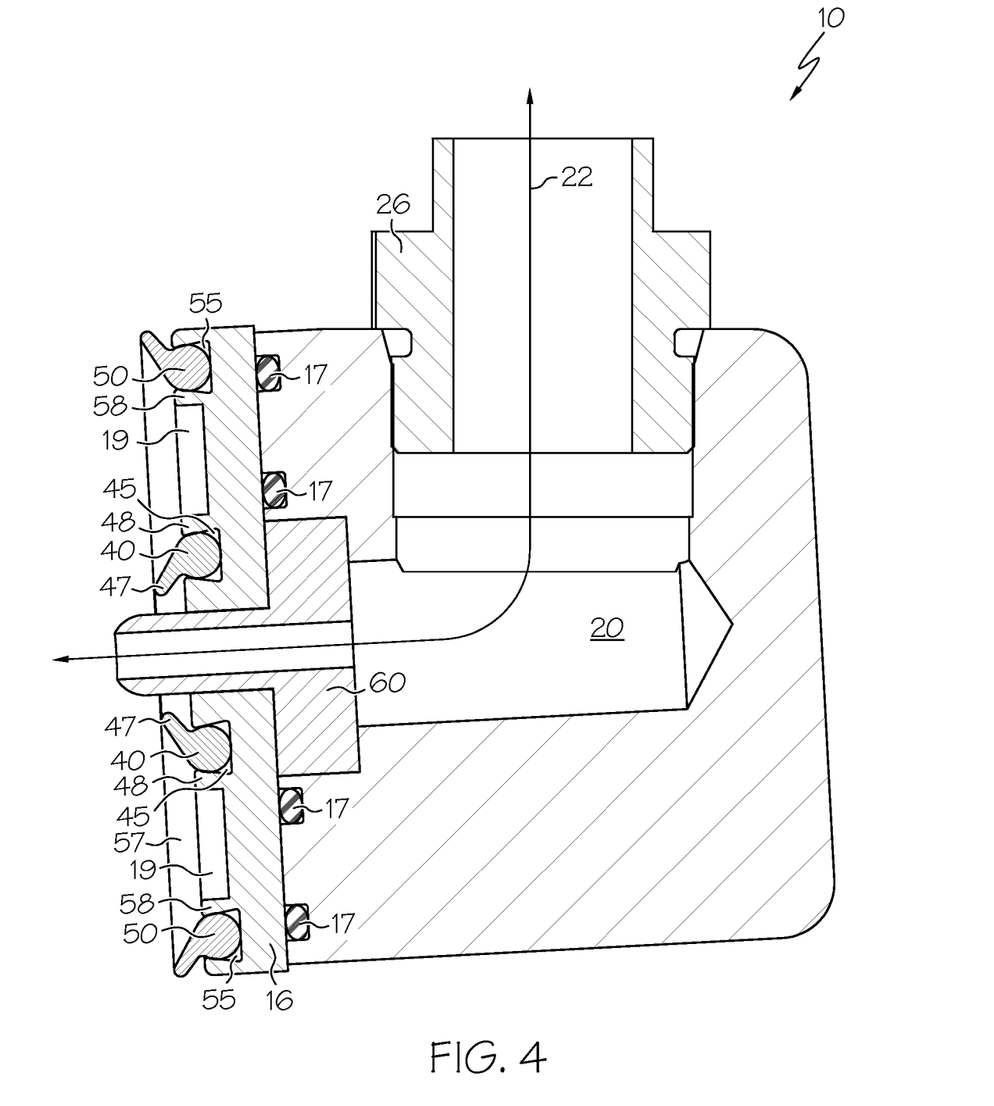
FIG. 4 is a cross-sectional plan view showing the tool body of the tool for assisting leak testing of an enclosed volume.

Referring to FIG. 3A, the mounting face 15 has defined therein an outer seal groove 55 about the face perimeter and an inner seal groove 45 between the outer seal groove 55 and the nozzle port 27. The inner seal groove 45 may have the same shape as the nozzle port 27 and may be disposed around the outer perimeter of the nozzle port 27. In example embodiments, the inner seal groove 45 and the outer seal groove 55 are cut into the mounting face 15 in such a manner that a sealing ring may be retained within a corresponding groove. As shown in FIG. 4, for example, the inner seal groove 45 and the outer seal groove 55 may be dovetail-type grooves. The tool body 10 may include face plate seals 17 that assist the mounting of the face plate 16. The face plate seals 17 may comprise, for example, common o-rings.

In example embodiments, the mounting face 15 may have defined therein a surface impression 19 disposed between the inner seal groove 45 and the outer seal groove 55. As apparent from the perspective view of FIG. 1, the surface impression 19 may be disposed between an inner rim 48 of the mounting face 15 and an outer rim 58 of the mounting face 15. In the side view of FIG. 4, the inner rim 48 is shown between the inner seal groove 45 and the surface impression 19, and the outer rim 58 is shown between the outer seal groove 55 and the surface impression 19. The presence of the surface impression 19 in the mounting face 15 provides for a larger sealing volume that will be operable to be evacuated through the vacuum port 37 during operation of the tool, as to hold the tool to a test port more strongly than if the surface impression 19 were not present.

Referring again to FIGS. 1 and 2, a vacuum conduit 30 is defined through the tool body 10 so as to provide a fluid connection between the vacuum inlet 35 and the vacuum port 37 in the mounting face 15. A primary conduit 20 is defined through the tool body 10 so as to provide fluid connection between the primary connection 25 and the nozzle port 27. In example embodiments, the vacuum conduit 30 and the primary conduit 20 may be defined by bores machined through a solid tool body. Alternatively, the vacuum conduit 30 and the primary conduit 20 may comprise appropriate tubing, fittings, couplings, or any combination of these mounted within a hollow tool body.

The tool body 10 further comprises a nozzle 60 disposed in the nozzle port 27. As shown in FIG. 4, the nozzle 60 is in fluid connection with the primary conduit 20 along flowpath 22. Thus, gas may enter the tool body 10 through the primary connection fitting 26 and leave the tool body 10 through the nozzle 60. In such a configuration the tool 1 functions as a fill tool. Alternatively, gas may enter the tool body 10 through the nozzle 60 and leave the tool body 10 through the primary connection fitting 26. In such a configuration, the tool 1 functions as an outlet tool.

Figure 5A:
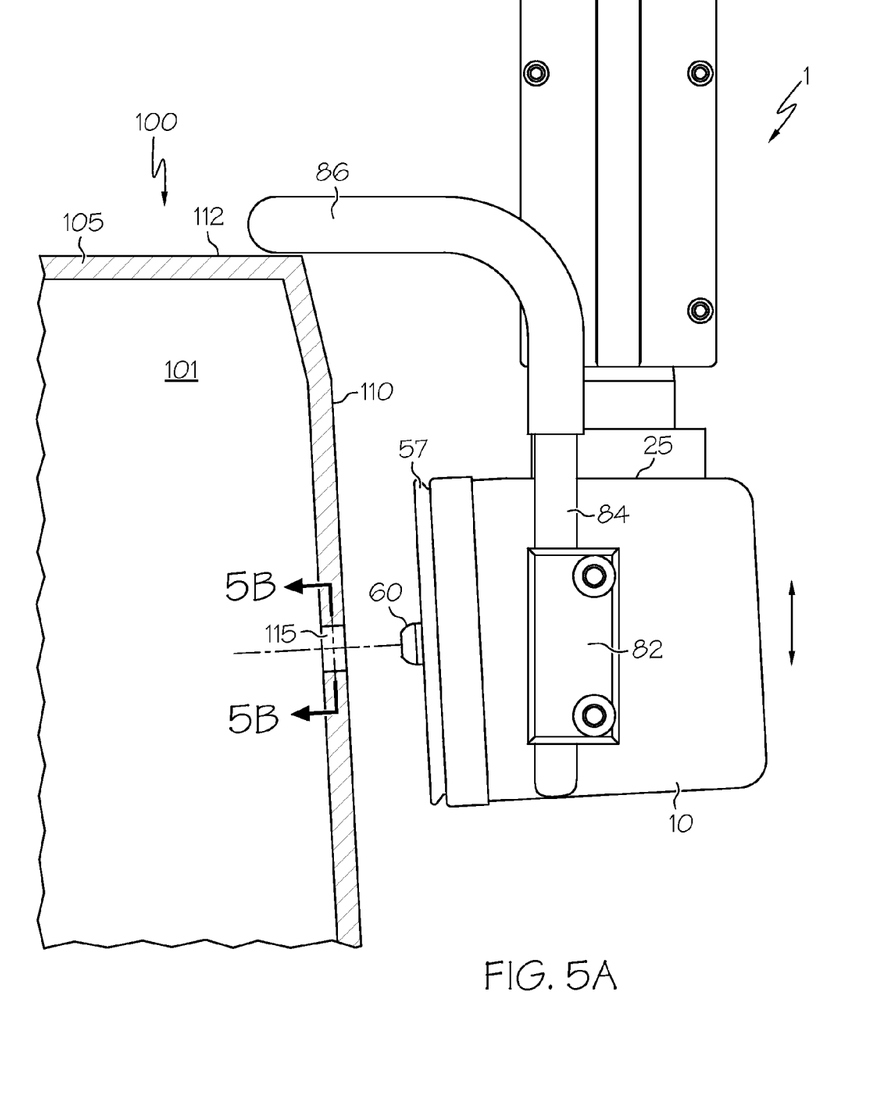
FIG. 5A is a side view of an embodiment of the tool for assisting leak testing of an enclosed volume, showing the connection of the tool to the enclosed volume.

Referring to FIG. 5A, an enclosure 100 is shown to illustrate the coupling of the tool 1 to a test port 115 during a leak testing procedure. The enclosure 100 comprises an enclosure outer wall 105 that defines an enclosed volume 101 within the enclosure 100. The enclosure outer wall 105 may have any configuration, of which only one is shown for illustration. In example embodiments, the enclosure 100 may comprise, for example, a battery enclosure such as a battery cover. Prior to operation of the tool 1, the nozzle 60 is placed in fluid connection with a test port 115 defined in the enclosure outer wall 105. As such, the nozzle 60 provides fluid connection between the external conduit 120 (FIG. 2) and the enclosed volume 101 through the primary conduit 20 and the test port 115. In some embodiments, the nozzle 60 may include features such as baffles (not shown) or flow diverters (not shown) configured to agitate a gas flowing through the nozzle 60.

Figure 5B:
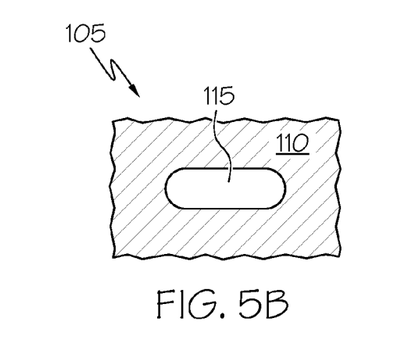
FIG. 5B is a detail view of a test port defined in an outer wall of the enclosed volume.

The shape of the test port 115 in inset view FIG. 5B is provided for illustrative purposes, not by way of limitation. It will be readily apparent that the test port 115 can be shaped according to any number of desired configurations and that the nozzle 60 and the nozzle port 27 may be customized to the fit the shape of the test port 115. It also will be apparent that, although the nozzle 60 is depicted as a male-type piece to be insertable into the test port 115 (depicted in a female-type configuration), as in example embodiments not shown the nozzle may be configured as a female piece into which a male-type connection on the test port may be inserted.

The tool body 10 further comprises an inner sealing ring 40 seated in the inner seal groove 45 and an outer sealing ring 50 seated within the outer seal groove 55. Referring to FIGS. 3A-3E, the outer sealing ring 50 is shaped according to the shape of the outer seal groove 55, and the inner sealing ring 40 is shaped according to the shape of the inner seal groove 45. The outer sealing ring 50 and the inner sealing ring 40 may comprise any material capable of providing a vacuum seal between an evacuated volume and a flat surface. Suitable materials include any material commonly used as vacuum o-ring seals such as, for example, a plastic, a polymer, or a rubber such as urethane rubber.

Figure 3B:
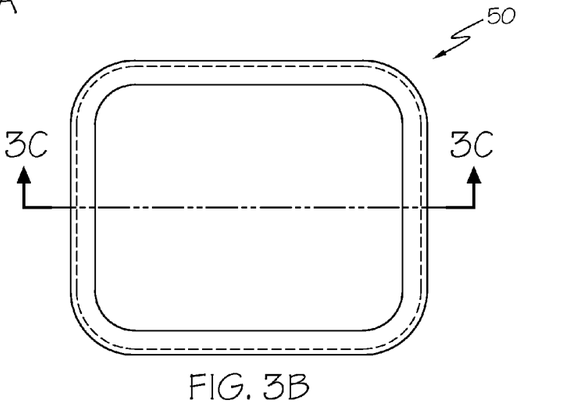
FIG. 3B is a plan view of an outer sealing ring of the tool for assisting leak testing of an enclosed volume.
Figure 3C:
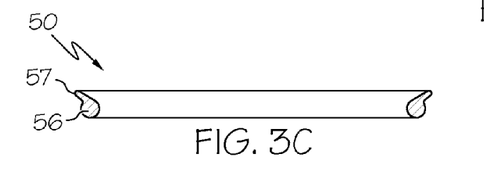
FIG. 3C is a cross-sectional perspective view of the outer sealing ring in FIG. 3B.
Figure 3D:
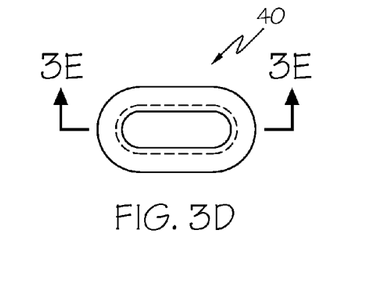
FIG. 3D is a plan view of an inner sealing ring of the tool for assisting leak testing of an enclosed volume.

In example embodiments, the outer sealing ring 50 may comprise additional features such as those shown in FIG. 3B. Particularly, the outer sealing ring 50 may have a cross-section that defines an outer seal seating portion 56 and an outer seal lip 57. Though shown as essentially cylindrical in cross-section, the outer seal seating portion 56 may be configured in any suitable manner to allow the outer sealing ring 50 to seat securely within the outer seal groove 55. For example, the outer seal seating portion 56 may define a trapezoidal cross-section to fit precisely within a corresponding dovetail shape of the outer seal groove 55. The outer seal lip 57 may be configured to extend out of the plane of the mounting face 15 and slightly outwardly with respect to the center of the mounting face 15, so as to increase the amount of contact of the tool with the surface of the enclosed volume (not shown) during operation of the tool. The outer sealing ring 50 defines within its perimeter an attachment face of the tool 1, as distinguished from the mounting face 15. The designation of an attachment face thus refers to a portion of the mounting face 15 that is fluidly isolated from the external environment when the tool 1 is operated.

Figure 3E:
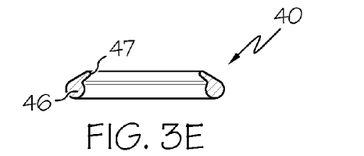
FIG. 3E is a cross-sectional perspective view of the inner sealing ring in FIG. 3D.

In example embodiments, alternatively or additionally the inner sealing ring 40 may comprise features such as shown in FIG. 3E. Particularly, the inner sealing ring 40 may have a cross-section that defines an inner seal seating portion 46 and an inner seal lip 47. Though shown as essentially cylindrical, the inner seal seating portion 46 may be configured in any suitable manner to allow the inner sealing ring 40 to seat securely within the inner seal groove 45. For example, the inner seal seating portion may define a trapezoidal cross-section to fit precisely within a corresponding dovetail shape of the inner seal groove 45. The inner seal lip 47 may be configured to extend out of the plane of the mounting face 15 and slightly inwardly toward the nozzle port 27 so as to provide vacuum-tight isolation of the nozzle port 27 from the mounting face 15 during operation of the tool 1.

Referring to FIGS. 1, 5A, and 5B, during operation of the tool 1, the nozzle 60 is placed in fluid connection with the test port 115 and the enclosed volume 101 by, for example, inserting the nozzle 60 into the test port 115. In the example embodiment of FIG. 5A, the tool body 10 is configured such that the nozzle 60 points at an angle slightly below horizontal, so as to be perpendicular to the test port 115, which is defined in a portion of the enclosure outer wall 105 having a sloped surface 110 that deviates slightly from true vertical. In alternative embodiments not shown, the nozzle may point horizontally and be placed in fluid connection with a test port defined in a vertical wall of the enclosed volume.

When fluid connection between the nozzle 60 and the test port 115 is so established, the outer sealing ring 50 (and more specifically, the outer seal lip 57) is operable to form a vacuum-tight seal against the sloped surface 110 of the enclosure outer wall 105. Thereby, the mounting face 15 is isolated from the external environment. Furthermore, the inner sealing ring 40 is operable to form a vacuum-tight seal against the nozzle 60, so as to isolate the nozzle 60 from the portion of the mounting face 15 between the inner sealing ring 40 and the outer sealing ring 50. The double isolation of the nozzle 60 from the external environment by means of the inner sealing ring 40 and the outer sealing ring 50 prevents leakage of any tracer gases into the external environment during a leak-testing procedure. Leakage of tracer gases into the external environment is advantageously avoided because the leaked tracer gases contaminate a process chamber, necessitating a lengthy purging procedure before leak testing can be resumed.

The sloped surface 110, the outer sealing ring 50 (specifically, the outer seal lip 57), the inner sealing ring 40, and the mounting face 15 of the tool body 10 define a sealing volume. During operation of the tool 1, this sealing volume may be evacuated through the vacuum port 37. When the sealing volume is sufficiently evacuated such that the strength of the vacuum overcomes the force of gravity on the tool 1, the tool 1 is held firmly in place against the sloped surface 110. In example embodiments, the sealing volume is sufficiently evacuated at a pressure of about 1.0 psi. The pressure inside the sealing volume can be monitored by an external gauge (not shown) that will indicate the required pressure and also will ensure that the tool 1 is properly mounted in the test port 115.

Referring again to FIGS. 1 and 2, in further example embodiments, the tool 1 may comprise a handle 70. The handle 70 may be constructed of any suitable rigid material and may comprise one or more pieces. As apparent from FIG. 2, the handle 70 may comprise a first handle piece 72 and a second handle piece 74 that can be joined together tightly by any suitable fastening means, such as by one or more handle screws 76. The handle 70 may be of any desired length. As shown in FIG. 2, the first handle piece 72 and the second handle piece 74 may be configured to function as a clamp that securely holds the external conduit 120 onto the primary connection fitting 26. Such a clamp configuration advantageously prevents disconnection of the external conduit 120 when the tool 1 is used in a leak-testing procedure. Furthermore, the handle 70 may function generally as a grip for the operator, thereby aiding the operator to insert the nozzle 60 of the tool 1 into a test port of an enclosed volume, as described above with reference to FIG. 5A. Though the external conduit 120 generally has some rigidity to it, the addition of a handle 70 provides the operator with substantially increased control over the tool 1, which can result in decreased processing times.

Referring to FIGS. 1 and 5A, in further example embodiments, the tool 1 may comprise a guide bar 80. The guide bar 80 may be attached to one or more side faces 14 of the tool body 10, for example, by guide bar attachment piece 82. The guide bar may comprise a guide bar arm 84 and a guide bar horizontal portion 86. The guide bar arm 84 may be operable to slide up and down within the guide bar attachment piece 82, so as to make the guide bar 80 vertically adjustable. As such, the guide bar 80 may be adjusted in advance of a procedure so that when the nozzle 60 of the tool 1 is placed in fluid communication with the test port 115, the guide bar horizontal portion 86 will rest against a horizontal surface 112 of the enclosure outer wall 105. Thereby, an operator advantageously can ensure quickly that the nozzle 60 of the tool 1 will align with the test port 115 without wasting the time necessary to visually locate the test port 115.

Figure 6:
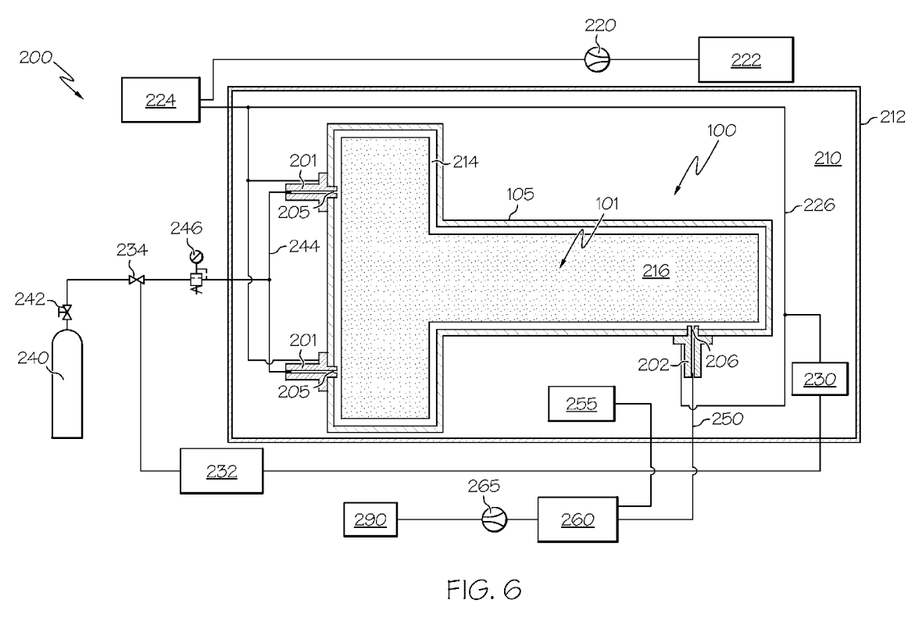
FIG. 6 is a schematic of an embodiment of a leak-test system comprising multiple tools for assisting leak testing of an enclosed volume, according to one or more embodiments of the tool.

The schematic diagram of FIG. 6 shows an example embodiment of a leak-test system 200 for leak testing an enclosure 100. An enclosed volume 101 is defined within an enclosure outer wall 105 of the enclosure 100, shown as cut away through a horizontal plane. The enclosure outer wall 105 may have any desired shape or three-dimensional contour, and thus is by no means limited to the T-shaped example depicted in FIG. 6. In the embodiment shown, within the enclosed volume 101 is an enclosed object 216. The enclosed object 216 may be any object required to be enclosed, for example, to protect the enclosed object 216 from exposure to the environment. In one embodiment, the enclosed object 216 may be a battery such as, for example, an electric-vehicle rechargeable energy storage system (RESS). As such, the enclosure outer wall 105 may represent a battery enclosure such as a cover that would protect a battery used in a vehicle or, more specifically, in an electric vehicle. It will be understood, however, that the enclosed volume 101 need not contain any enclosed object 216 and that, as such, the enclosed volume 101 may contain only air or be otherwise empty.

The enclosure 100, including any enclosed object 216 therein, may be disposed within a process chamber 210 defined by a process chamber wall 212. As such, the process chamber wall 212 functions to define a secondary enclosure isolating the enclosure outer wall 105 and the enclosed volume 101 from the external environment.

For illustrative purposes and not by means of limitation, the leak-test system 200 in FIG. 6 utilizes three tools, each in accordance with one or more embodiments of tools for assisting leak testing of an enclosed volume, previously described herein. Fill tools 201 are in fluid connection with the enclosed volume 101 through fill ports 205 defined in the enclosure outer wall 105. An outlet tool 202 is in fluid connection with the enclosed volume 101 through outlet port 206 defined in the enclosure outer wall 105. As used herein, the nomenclature "fill tool 201" refers to a tool 1, as depicted in FIGS. 1, 2, and 4 and described above, configured such that the flow of gas along the flowpath 22 through the tool body 10 enters at the external conduit 120, proceeds through the primary conduit 20, and exits through the nozzle 60. As used herein, the nomenclature "outlet tool 202" refers to a tool 1, as depicted in FIGS. 1, 2, and 4 and described above, configured such that the flow of gas along the flowpath 22 through the tool body 10 enters through the nozzle 60, proceeds through the primary conduit 20, and exits to the external conduit 120. Fill ports 205 and outlet port 206 are equivalent to the test port 115 shown in FIG. 5B and described above. It will be understood that the leak-test system 200 may comprise any fill tools 201 and outlet tools 202 in any desired number or configuration, the number or configuration chosen according to the shape of the enclosure outer wall 105 and the resulting need to ensure that tracer gas can permeate into all topographical features defined by the enclosure outer wall 105. In further embodiments, the leak-test system 200 may utilize one or more of the fill tools 201 but may lack an outlet tool 202. In such embodiments, if any outlet ports 206 are provided, they are connected to other components of the leak-test system 200 by alternative means. If no outlet ports are present in the enclosure outer wall 105, a means for pressure relief of the enclosed volume may be provided such as, for example, a valve (not shown).

The nozzles of the fill tools 201 attached to fill ports 205, and the nozzle of the outlet tool 202 attached to the outlet port 206, extend through the enclosure outer wall 105 at least into an interstitial volume 214 between the enclosure outer wall 105 and the enclosed object 216. If the distance between the enclosure outer wall 105 and the enclosed object 216 is particularly small, for example less than 10 mm, the fill tools 201 may be equipped with agitating means within their nozzles to ensure that tracer gas molecules permeate through the entirety of the interstitial volume 214.

The fill tools 201 and the outlet tool 202 are held by vacuum against the enclosure outer wall 105. Thus, the fill tools 201 are securely seated in the fill ports 205, and the outlet tool 202 is securely seated in the outlet port 206. The vacuum is generated by tool assist vacuum pump 220, which exhausts to the environment through tool assist pump exhaust 222. A vacuum control valve 224 can be opened to apply suction to a vacuum line 226 in fluid communication with the corresponding vacuum ports in each of the fill tools 201 and the outlet tool 202. Once all the tools are properly attached to the ports, a pressure sensor 230 indicates to the tracer gas valve control apparatus 232 that a drop in the pressure within the vacuum line 226. The tracer gas valve control apparatus 232 then sends an appropriate signal to open the tracer gas control valve 234.

When the tracer gas control valve 234 is open, tracer gas flows from tracer gas source 240, through a gas source regulator 242 set to a desired maximum pressure, and through tracer gas line input gauge 246. Any suitable gas may be used as the tracer gas. Examples of suitable tracer gases include, without limitation, helium, other noble gases, nitrogen, or other inert gases. It will be appreciated that gases having a low molecular weight or a small molecular radius will be most likely to fit through small leaks within the enclosure outer wall 105 and bring such leaks to the attention of an operator. Even so, it is contemplated that the leak-test system 200 readily could be employed to verify that the enclosure outer wall 105 is leak-free with respect to any gas such as, for example, hydrogen, oxygen, or volatile organics, including those having a high molecular weight. The tracer gas line input gauge 246 may be configured, for example, as a simple pressure monitor, as an adjustable pressure regulator, or as a mass flow controller and optionally may be connected to a device (not shown) that records tracer gas flow over time during a testing cycle. In some embodiments, data from the tracer gas line input gauge 246 may be used to calculate the number of molecules of tracer gas that have entered the tracer gas line 244, such as by integration of a flow-rate versus time curve. Thereupon, tracer gas flows through tracer gas line 244 and is distributed to the fill tools 201 to be injected into the enclosed volume 101. In this sense, the tracer gas line 244 is functionally equivalent to the external conduit 120 described above with respect to the tool 1 shown in FIG. 2. Tracer gas can escape from the enclosed volume 101 by one of two routes: a process chamber outlet 255 or through tracer gas outlet 250.

If a leak is present anywhere in the enclosure outer wall 105, the tracer gas is released into the process chamber 210. Thereupon, the tracer gas in the process chamber 210 can be evacuated from the process chamber 210 through a process chamber outlet 255 in fluid connection with analytical apparatus vacuum pump 265. The analytical apparatus vacuum pump 265 is exhausted to the external environment through system exhaust 290. In the embodiment shown, the process chamber outlet 255 is in fluid communication also with analytical apparatus 260. Analytical apparatus 260 is any instrument suitable for qualitatively detecting the tracer gas or quantitatively measuring the amount of tracer gas. An example of a suitable instrument is a mass spectrometer. Thus, when the analytical apparatus 260 detects that tracer gas has exited the process chamber 210 through the process chamber outlet 255, the enclosure outer wall 105 has been positively identified as defective for containing at least one leak.

Regardless whether leaks are present in the enclosure outer wall 105, tracer gas will flow from the enclosed volume 101, through the outlet tool 202, and into tracer gas outlet 250. The tracer gas is drawn through tracer gas outlet 250 into the analytical apparatus 260, assisted by the vacuum generated by the analytical apparatus vacuum pump 265. The analytical apparatus 260 may be configured to qualitatively or quantitatively measure the tracer gas flowing out through the tracer gas outlet 250. Through a quantitative measurement of tracer gas flowing through the tracer gas outlet 250, an operator can verify that the number of molecules of tracer gas that entered the enclosed volume 101 through the tracer gas line 244 is equal to or less than the number of molecules that exited the enclosed volume 101 through the tracer gas outlet 250.

If the number of molecules out through tracer gas outlet 250 equals the number of molecules in through tracer gas line 244, the leak-test system 200 has positively determined that the enclosure outer wall 105 contains no leaks and has passed quality assurance standards. If fewer molecules leave through tracer gas outlet 250 than had entered through tracer gas line 244, the leak-test system 200 has indicated either that the enclosure outer wall 105 contains a leak or that some tracer gas molecules remain within pockets or crevices within the enclosure outer wall 105, the interstitial volume 214, or the enclosed object 216 inside the enclosed volume 101. For this reason, a qualitative determination of tracer gas having exited the process chamber 210 through the process chamber outlet 255 may aid an additional clue to whether a discrepancy between molecules in and molecules out is the consequence of a leak. It will be understood that determination of whether the enclosure outer wall 105 has passed or failed quality assurance standards in such a situation must take into account the possibility of tracer gas remaining trapped within the enclosure 100 and must set an acceptable threshold amount.

In one embodiment, a method for leak-testing an enclosed volume may comprise providing a battery enclosure that defines an enclosed volume therein. The battery enclosure may have at least one fill port and at least one outlet port defined in an outer wall of the battery enclosure. At least one fill tool is provided. The at least one fill tool may comprise a tool according to other embodiments, described above, configured to have a fill tool primary connection in fluid connection with a tracer gas line. The tracer gas line is connected to a tracer gas source. A vacuum source coupled to the vacuum port of the fill tool may be activated before the fill tool is attached. With the assistance of the resulting vacuum, the nozzle of the fill tool is coupled to the fill port, so as to produce a vacuum-tight seal of the fill tool against the enclosure outer wall, particularly effected by the outer seal of the fill tool. The at least one outlet port is coupled to a tracer gas outlet, which may be in fluid connection to an analytical instrument.

A gas source valve is opened to produce a tracer gas flow from the tracer gas source, through the fill tool nozzle, through the enclosed volume, through the tracer gas outlet, and into the analytical instrument. The amount of tracer gas flowing into the analytical instrument is determined by the analytical instrument.

In a further embodiment, the coupling of the outlet port to the tracer gas outlet may comprise providing at least one outlet tool. The at least one outlet tool may comprise a tool according to other embodiments, described above, configured to have an outlet tool primary connection in fluid connection with the tracer gas outlet. The at least one outlet tool is coupled to the at least one outlet port in a manner similar to the coupling of the fill tool to the fill port.

In still further embodiments of methods for leak testing an enclosed volume, a process chamber may be disposed about the battery enclosure, such that the process chamber completely surrounds the battery enclosure and isolates the battery enclosure from the external environment. The process chamber may be analyzed for the presence of said tracer gas therein, either by qualitative or quantitative methods. The analytical instrument may comprise, for example, a mass spectrometer.

In still further embodiments of methods for leak testing an enclosed volume, the at least one fill tool may further comprises a fill tool guide bar, the at least one outlet tool may further comprise an outlet tool guide bar, or all tools may comprise guide bars. Thus, the method may further comprise contacting the fill tool guide bar to a horizontal surface of the outer wall to vertically align the fill tool with the fill port. The method may further comprise contacting the outlet tool guide bar to the outer wall to vertically align the outlet tool with the outlet port.

The methods for leak testing a battery enclosure are useful for leak testing any type of enclosure having enclosure outer walls defining an enclosed volume, for which manufacturing specifications of the enclosure require little or no tolerance for leaks of any kind. Thus, in some embodiments the methods may be employed when an the enclosed object is, for example, a battery is disposed within the enclosure, and the enclosure outer wall defining the enclosed volume is a battery cover. In an example embodiment, a method for leak testing an enclosed volume may comprise an enclosed volume having therein an electric-vehicle rechargeable energy storage system, wherein the outer wall defining the enclosed volume is a battery cover.

It is noted that terms like "preferably," "commonly," and "typically" may be utilized herein but that such terms are not intended to limit the scope of the claimed invention or to imply that certain features are critical, essential, or even important to the structure or function of the claimed invention. Rather, these terms are intended merely to highlight alternative or additional features that may or may not be utilized in a particular embodiment.

For the purposes of describing and defining the present invention it is noted that the term "tool" is utilized herein to represent a combination of components and individual components, regardless of whether the components are combined with other components. For example, a "tool" according to the present disclosure may comprise a tool, a system incorporating the tool, a method incorporating the tool, etc.

For the purposes of describing and defining the present invention it is noted that the term "substantially" is utilized herein to represent the inherent degree of uncertainty that may be attributed to any quantitative comparison, value, measurement, or other representation. In the present context, the term "substantially" is also utilized herein to represent the degree by which a quantitative representation may vary from a stated reference without resulting in a change in the basic function of the subject matter at issue. As such, it is utilized to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

From the foregoing detailed description with reference to specific embodiments, it will be apparent that modifications and variations are possible that do not depart from the scope of the invention defined in the appended claims. More specifically, even if some aspects of the present invention are identified herein as preferred or particularly advantageous, it is contemplated that the present invention is not necessarily limited to such preferred aspects of the invention.

What is claimed is:

1. A tool for fluidly coupling an external conduit to a test port defined in an enclosure outer wall of an enclosure, said tool comprising:
   an outer seal defining an attachment face of said tool inside the perimeter of said outer seal;
   a vacuum port defined in said attachment face, said vacuum port configured to be fluidly coupled to a vacuum source;
   a nozzle disposed in said attachment face and configured to be coupled to said test port so as to be in fluid communication with an enclosed volume within said enclosure;
   a primary connection in fluid connection with said nozzle, said primary connection configured to be placed in fluid connection with said external conduit;
   a handle that clamps said external conduit to a primary connection fitting disposed in said primary connection; and
   a nozzle seal disposed in said attachment face around the perimeter of said nozzle, such that when said nozzle is coupled to said test port, said nozzle is fluidly isolated from said vacuum port and said outer seal contacts said enclosure outer wall so as to form a vacuum-locking fit between said tool and said enclosure.

2. The tool of claim 1, further comprising a guide bar attached to said tool.

3. A battery leak-test tool comprising:
   a tool body;
   a primary connection configured to establish fluid connection between said tool body and an external conduit;
   a vacuum inlet configured to establish vacuum connection between said tool body and a vacuum source;
   a mounting face of said tool body having defined therein a vacuum port, a nozzle port, an outer seal groove about a perimeter of said mounting face, and an inner seal groove between said outer seal groove and said nozzle port;
   a vacuum conduit defined through said tool body, said vacuum conduit configured to provide fluid connection between said vacuum inlet and said vacuum port;
   a primary conduit defined through said tool body, said primary conduit configured to provide fluid connection between said primary connection and said nozzle port;
   a nozzle disposed in said nozzle port in fluid connection with said primary conduit, said nozzle configured to be placed fluid connection with a test port defined in an outer wall of a battery enclosure;
   a handle that clamps said external conduit to a primary connection fitting disposed in said primary connection;
   an inner sealing ring seated in said inner seal groove; and
   an outer sealing ring seated in said outer seal groove,
   wherein when said nozzle is in fluid connection with said test port, said outer sealing ring, said inner sealing ring, said mounting face, and said outer wall of said battery enclosure define a sealing volume.

4. The battery leak-test tool of claim 3, further comprising a guide bar attached to said tool body.

5. The battery leak-test tool of claim 4, wherein said guide bar is vertically adjustable.

6. The battery leak-test tool of claim 5, wherein said guide bar comprises a guide bar horizontal portion configured to rest on a horizontal surface of said outer wall of said battery enclosure during operation of said tool.

7. The battery leak-test tool of claim 3, further comprising a guide bar attached to at least one side face of said tool body, said guide bar comprising a horizontal portion configured to rest on a horizontal surface of said outer wall of said battery enclosure during operation of said tool.

8. The battery leak-test tool of claim 3, wherein said mounting face further has defined therein a surface impression disposed between said inner seal groove and said outer seal groove.

9. A method for leak-testing a battery enclosure, the method comprising:
   providing a battery enclosure that defines an enclosed volume therein, said battery enclosure having at least one fill port and at least one outlet port defined in an outer wall thereof;

providing at least one fill tool, said at least one fill tool comprising:
- a fill tool outer seal defining a fill tool attachment face inside the perimeter of said fill tool outer seal;
- a fill tool vacuum port defined in said fill tool attachment face, said fill tool vacuum port in fluid connection to a vacuum source;
- a fill tool nozzle disposed in said fill tool attachment face and configured to be coupled to said at least one fill port so as to be in fluid communication with said enclosed volume;
- a fill tool primary connection in fluid connection with said fill tool nozzle and with a tracer gas line connected to a tracer gas source; and
- a fill tool nozzle seal disposed in said fill tool attachment face around the perimeter of said fill tool nozzle, such that, when said fill tool nozzle is coupled to said at least one fill port, said fill tool nozzle is fluidly isolated from said fill tool vacuum port;

coupling said fill tool nozzle to said at least one fill port;
drawing a vacuum to produce a vacuum-tight seal of said at least one fill tool against said outer wall;
coupling said at least one outlet port to a tracer gas outlet, said tracer gas outlet in fluid connection to an analytical instrument;
opening a gas source valve to introduce a tracer gas flow into said battery enclosure and said analytical instrument; and
determining the amount of tracer gas flowing into said analytical instrument.

10. The method of claim 9, wherein the coupling said at least one outlet port to a tracer gas outlet comprises:
providing at least one outlet tool, said at least one outlet tool comprising:
- an outlet tool outer seal defining an outlet tool attachment face inside the perimeter of said outlet tool outer seal;
- an outlet tool vacuum port defined in said outlet tool attachment face, said outlet tool vacuum support in fluid connection to said vacuum source;
- an outlet tool nozzle disposed in said outlet tool attachment face and configured to be coupled to said at least one outlet port so as to be in fluid communication with said enclosed volume;
- an outlet tool primary connection in fluid connection with said outlet tool nozzle and with a tracer gas outlet connected to an analytical instrument; and
- an outlet tool nozzle seal disposed in said outlet tool attachment face around the perimeter of said outlet tool nozzle, such that when said outlet tool nozzle is coupled to said at least one outlet port, said outlet tool nozzle is fluidly isolated from said outlet tool vacuum port; and coupling said outlet tool nozzle to said at least one outlet port so as to produce a vacuum-tight seal of said at least one outlet tool against said outer wall.

11. The method of claim 10, further comprising disposing a process chamber about said battery enclosure, such that said process chamber completely surrounds said battery enclosure and isolates said battery enclosure from the external environment.

12. The method of claim 11, further comprising analyzing said process chamber for the presence of tracer gas therein.

13. The method of claim 10, wherein said analytical instrument comprises a mass spectrometer.

14. The method of claim 10, wherein said fill tool further comprises a fill tool guide bar and said outlet tool further comprises an outlet tool guide bar.

15. The method of claim 14, further comprising:
contacting said fill tool guide bar to a horizontal surface of said outer wall to vertically align said fill tool with said fill port; and
contacting said outlet tool guide bar to a horizontal surface of said outer wall to vertically align said outlet tool with said outlet port.

16. The method of claim 15, wherein said battery enclosure is a cover for an electric-vehicle rechargeable energy storage system.

* * * * *